(12) United States Patent
Aaron et al.

(10) Patent No.: US 8,977,745 B2
(45) Date of Patent: *Mar. 10, 2015

(54) METHODS, COMMUNICATION NETWORKS, AND COMPUTER PROGRAM PRODUCTS FOR MONITORING, EXAMINING, AND/OR BLOCKING TRAFFIC ASSOCIATED WITH A NETWORK ELEMENT BASED ON WHETHER THE NETWORK ELEMENT CAN BE TRUSTED

(71) Applicant: AT&T Intellectual Property I, L.P., Reno, NV (US)

(72) Inventors: Jeffrey A. Aaron, Atlanta, GA (US); Edgar Vaughan Shrum, Jr., Smyrna, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/769,693

(22) Filed: Feb. 18, 2013

(65) Prior Publication Data

US 2013/0160118 A1     Jun. 20, 2013

Related U.S. Application Data

(63) Continuation of application No. 13/523,332, filed on Jun. 14, 2012, now Pat. No. 8,380,847, which is a continuation of application No. 11/315,864, filed on Dec. 22, 2005, now Pat. No. 8,224,952.

(51) Int. Cl.
*G06F 15/173* (2006.01)
*H04L 29/06* (2006.01)
*H04L 29/08* (2006.01)

(52) U.S. Cl.
CPC ........ *H04L 63/1408* (2013.01); *H04L 63/0263* (2013.01); *H04L 67/1057* (2013.01); *H04L 63/1441* (2013.01)
USPC .......................................................... 709/224

(58) Field of Classification Search
USPC .......................................................... 709/224
See application file for complete search history.

(56) References Cited

U.S. PATENT DOCUMENTS

| | | | |
|---|---|---|---|
| 7,024,548 B1 * | 4/2006 | O'Toole, Jr. ..................... 713/1 |
| 7,201,662 B2 * | 4/2007 | LeMay et al. ................... 463/43 |
| 7,206,934 B2 * | 4/2007 | Pabla et al. .................... 713/168 |
| 7,263,560 B2 * | 8/2007 | Abdelaziz et al. ............. 709/238 |
| 7,275,102 B2 * | 9/2007 | Yeager et al. .................. 709/224 |
| 7,299,277 B1 * | 11/2007 | Moran et al. ................... 709/224 |
| 2002/0059528 A1 * | 5/2002 | Dapp ............................. 713/201 |
| 2002/0133586 A1 * | 9/2002 | Shanklin et al. ............... 709/224 |
| 2003/0182421 A1 * | 9/2003 | Faybishenko et al. ........ 709/224 |
| 2003/0216172 A1 * | 11/2003 | LeMay et al. .................. 463/29 |
| 2004/0044727 A1 * | 3/2004 | Abdelaziz et al. ............. 709/203 |
| 2004/0064512 A1 * | 4/2004 | Arora et al. ................... 709/206 |
| 2004/0064568 A1 * | 4/2004 | Arora et al. ................... 709/228 |
| 2004/0064693 A1 * | 4/2004 | Pabla et al. .................... 713/168 |

(Continued)

*Primary Examiner* — Richard G Keehn
(74) *Attorney, Agent, or Firm* — Myers Bigel Sibley & Sajovec, PA

(57) ABSTRACT

A communication network is operated by determining whether a network element can be trusted and monitoring traffic associated with the network element based on whether the network element can be trusted. At least some of the monitored traffic may be selected for examination based on the degree of trust for the network element. At least some of the monitored and/or examined traffic is selected to be blocked based on the degree of trust for the network element.

15 Claims, 3 Drawing Sheets

(56) References Cited

U.S. PATENT DOCUMENTS

| | | | |
|---|---|---|---|
| 2004/0177120 A1* | 9/2004 | Kirsch | 709/206 |
| 2005/0005154 A1* | 1/2005 | Danforth et al. | 713/200 |
| 2005/0071644 A1* | 3/2005 | Moghe et al. | 713/182 |
| 2007/0168292 A1* | 7/2007 | Jogand-Coulomb et al. | 705/52 |
| 2008/0010377 A1* | 1/2008 | Nissennboim | 709/226 |
| 2008/0028224 A1* | 1/2008 | Pitsos | 713/178 |

* cited by examiner

METHODS, COMMUNICATION NETWORKS, AND COMPUTER PROGRAM PRODUCTS FOR MONITORING, EXAMINING, AND/OR BLOCKING TRAFFIC ASSOCIATED WITH A NETWORK ELEMENT BASED ON WHETHER THE NETWORK ELEMENT CAN BE TRUSTED

CROSS REFERENCE TO RELATED APPLICATION

This application is a continuation of U.S. patent application Ser. No. 13/523,332, filed Jun. 14, 2012, which is a continuation of U.S. patent application Ser. No. 11/315,864, filed on Dec. 22, 2005, the disclosures of which are incorporated by reference herein in their entireties.

FIELD OF THE INVENTION

The present invention relates to communication networks and methods of operating the same, and, more particularly, to methods, systems, and computer program products for monitoring, examining, and/or blocking traffic on communication networks.

BACKGROUND OF THE INVENTION

It is often difficult to know how much scrutiny should be applied to network traffic/activity associated with a particular device, item, or network element. In particular, it may be difficult to determine when the associated traffic should be blocked for protective purposes. In conventional communication networks, monitoring and/or examination of traffic may be done relatively crudely, e.g., in an all or nothing fashion, may be done manually, which may be costly, and/or may be done automatically in a pre-determined fashion, which may result in too many false positives (i.e., blocking traffic that need not be blocked) and/or false negatives (i.e., allowing traffic that should be blocked and/or blocking the wrong traffic). Accordingly, there remains room for improvement in traffic monitoring, examination, and/or blocking systems and methods.

SUMMARY OF THE INVENTION

According to some embodiments of the present invention, a communication network is operated by determining whether a network element can be trusted and monitoring traffic associated with the network element based on whether the network element can be trusted.

In other embodiments, determining whether a network element can be trusted includes generating a first hash value based on data associated with the network element, generating a second hash value based on the data associated with the network element, and comparing the first hash value with the second hash value to determine whether the network element can be trusted.

In still other embodiments, comparing the first hash value with the second hash value to determine whether the network element can be trusted comprises comparing the first hash value with the second hash value to determine a degree of trust for the network element.

In still other embodiments, monitoring traffic comprises selecting traffic for monitoring using rules that are based on the degree of trust for the network element.

In still other embodiments, monitoring traffic further comprises specifying the traffic to be monitored based on traffic classification, a time duration, and/or a traffic amount.

In still other embodiments, monitoring traffic further comprises monitoring the traffic using rules, pattern matching techniques, and/or deviation from expected values techniques to determine if the traffic contains unexpected information based on the degree of trust for the network element, and providing results with respect to whether the traffic contains unexpected information to a human expert interface based on the degree of trust for the network element.

In still other embodiments, monitoring traffic further comprises obtaining input via the human expert interface and revising the results with respect to whether the traffic contains unexpected information based on the obtained input.

In still other embodiments, at least some of the monitored traffic is selected for examination based on the degree of trust for the network element.

In still other embodiments, the selected at least some of the monitored traffic is examined using rules, pattern matching techniques, and/or deviation from expected values techniques to determine if the traffic contains unexpected information based on the degree of trust for the network element, and results are provided with respect to whether the traffic contains unexpected information to a human expert interface based on the degree of trust for the network element. A level of examination of the at least some of the monitored traffic is based on the degree of trust for the network element.

In still other embodiments, examining the selected at least some of the monitored traffic comprises obtaining input via the human expert interface and revising the results with respect to whether the traffic contains unexpected information based on the obtained input.

In still other embodiments, at least some of the monitored and/or examined traffic is selected to be blocked based on the degree of trust for the network element.

In still other embodiments, the selected at least some of the monitored and/or examined traffic is blocked using filtering based on source/destination address, port, protocol, and/or state of a connection/session.

In still other embodiments, blocking the selected at least some of the monitored and/or examined traffic comprises obtaining input via the human expert interface and permanently blocking the selected at least some of the monitored and/or examined traffic based on the obtained input.

In still other embodiments, the rules, pattern matching techniques, and/or deviation from expected values techniques used in monitoring the traffic and/or examination of at least some of the monitored traffic may be modified so as to allow the monitoring and/or examination of the traffic to adapt to changing conditions.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of exemplary embodiments thereof when read in conjunction with the accompanying drawings, in which.

DETAILED DESCRIPTION OF EXEMPLARY EMBODIMENTS

Figure 1:
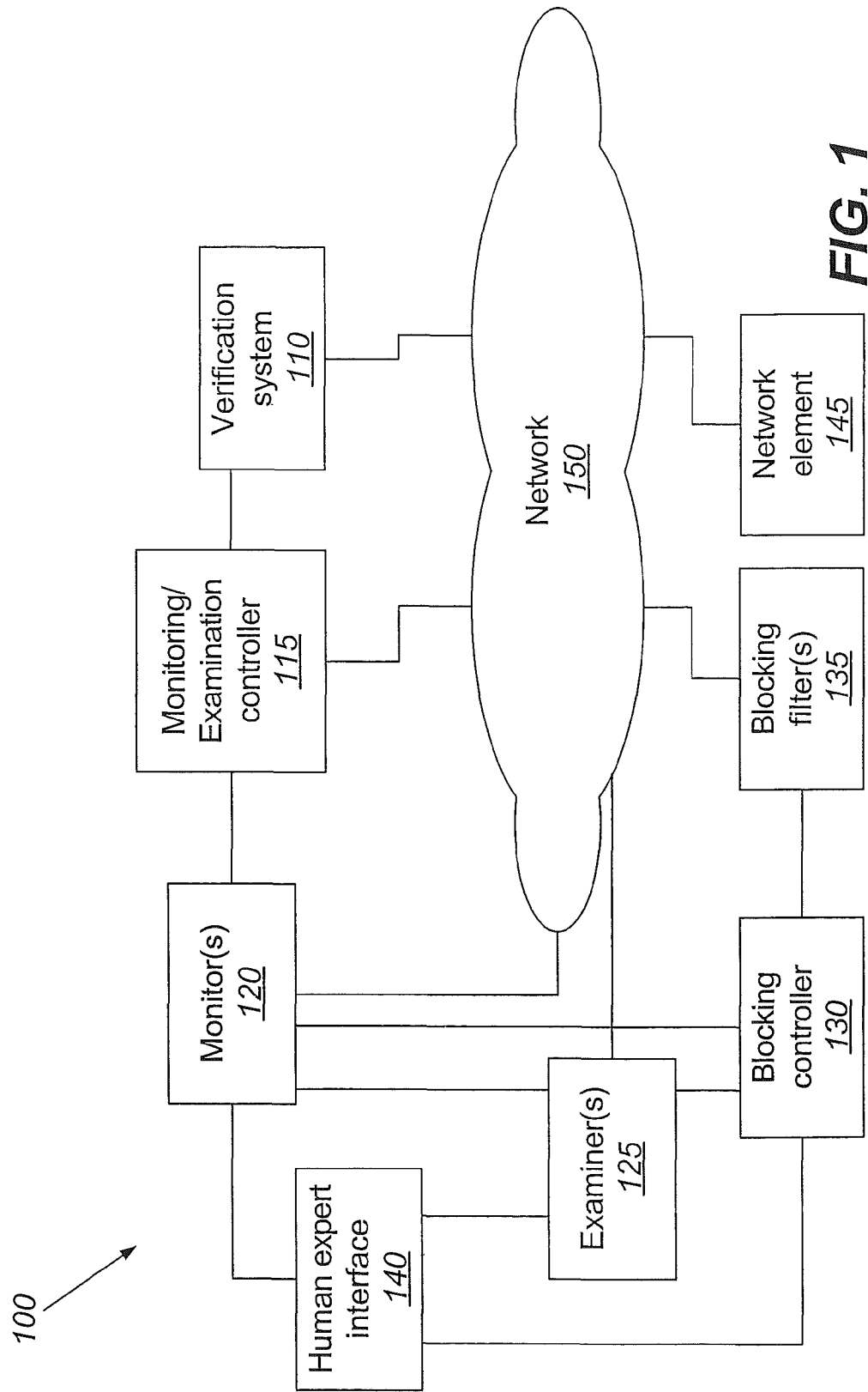
FIG. 1 is a block diagram that illustrates a communication network in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described herein with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Embodiments of the present invention are described hereafter in the context of processing a packet. It will be understood that the term "packet" means a unit of information and/or a block of data that may be transmitted electronically as a whole or via segments from one device to another. Accordingly, as used herein, the term "packet" may encompass such terms of art as "frame" and/or "message," which may also be used to refer to a unit of transmission.

In some embodiments of the present invention, a determination can be made whether a network element is configured in an authorized manner, e.g., whether the network element is configured with authorized firmware, software, and/or data. In this regard, a determination is made whether the network element can be trusted and to what degree the network element can be trusted. Based on this determination of whether the network element can be trusted and/or the level of trust determined for the network element, the traffic associated with the network element can be monitored, examined, and/or blocked in a desired manner.

Referring now to FIG. 1, an exemplary network architecture 100 for monitoring, examining, and/or blocking traffic associated with a network element based on whether the network element can be trusted, in accordance with some embodiments of the present invention, comprises a verification system 110, a monitoring/examination controller 115, one or more trust-controlled monitors 120, one or more trust controlled examiners 125, a blocking controller 130, one or more blocking filters 135, a human expert interface 140, a network element 145, and a communication network 150 that are connected as shown. The network 150 may represent a global network, such as the Internet, or other publicly accessible network. The network 150 may also, however, represent a wide area network, a local area network, an Intranet, or other private network, which may not accessible by the general public. Furthermore, the network 150 may represent a combination of public and private networks or a virtual private network (VPN).

The verification system 110 may be configured to determine whether then network element 145 is trustable or not, by, for example, determining a degree of trust for the network element 145. In some embodiments, trust-relevant information from additional sources could alternately or additionally be considered. Such additional trust-relevant sources may include, but are not limited to, various network management systems, policy-based control systems, monitoring systems, including intrusion detection/protection systems, security scanning systems, third party security notification systems, outsourced security consulting/management services/systems, and/or security relevant information aggregation systems. This trust information may then be provided to the monitoring/examination controller 115. The verification system 110 may be embodied as described in, for example, U.S. patent application Ser. No. 10/880,249 entitled "Verification of Consumer Equipment Connected to Packet Networks Based on Hashing Values" (hereinafter '249 application), and U.S. patent application Ser. No. 10/886,169 entitled "Controlling Quality of Service and Access in a Packet Network Based on Levels of Trust for Consumer Equipment" (hereinafter '169 application), the disclosures of which are hereby incorporated herein by reference in their entireties.

As described in the '249 application and '169 application, the verification system 110 can determine a level of trust for the network element 145 by generating first and second hash values based on data that is associated with the network element 145. This data may represent any type of software and/or firmware, for example, associated with the network element 145. If the hash values are not identical, then an evaluation may be made whether the network element 145 can be trusted and/or what degree of trust may be assigned to the network element 145.

As used herein, the term "network element" includes any device that is configured to communicate traffic, such as packet traffic, using the communication network 150. Accordingly, the network element 145 may be, but is not limited to, a router, a gateway, a switching device, a cable modem, a digital subscriber line modem, a public switched telephone network modem, a wireless local area network modem, a wireless wide area network modem, a computer with a modem, a mobile terminal such as personal data assistant and/or cellular telephone with a modem. For network elements that communicate via the communication network 150 through a wireless interface, wireless protocols, such as, but not limited to, the following may be used: a cellular protocol (e.g., General Packet Radio System (GPRS), Enhanced Data Rates for Global Evolution (EDGE), Global System for Mobile Communications (GSM), code division multiple access (CDMA), wideband-CDMA, CDMA2000, and/or Universal Mobile Telecommunications System (UMTS)), a wireless local area network protocol (e.g., IEEE 802.11), a Bluetooth protocol, another RF communication protocol, and/or an optical communication protocol.

The monitoring/examination controller 115 may be configured to obtain trust and/or degree of trust information for network element(s) 145 from the verification system 110. Based on this trust information, the monitoring/examination controller 115 may determine what traffic or portions of traffic associated with the network element 145 should be monitored. The monitoring/examination controller 115 may access rules, patterns, and/or decision data that may be used in determining what traffic to monitor.

The monitor(s) 120 may be configured to receive traffic for monitoring from the monitoring/examination controller 115 and to provide monitoring results to and/or receive input from the human expert interface 140 based, for example, on a degree of trust associated with the network element 145. The monitor(s) 120 may monitor the traffic in-line, for example, in real-time using hardware and/or firmware to look for particular signatures and/or patterns and/or deviations from expected values of measurable quantities in the traffic. Monitoring of the traffic is described in more detail below.

The examiner(s) 125 may be configured to examine at least some of the monitored traffic obtained from the monitor(s) 120 and to provide examination results to and/or receive input from the human expert interface 140 based, for example, on a degree of trust associated with the network element 145. The examiner(s) 125 may examine monitored traffic using, for example, slower, more time and processing intensive techniques than used to monitor the traffic. For example, examination may be software-based and typically is not performed in real time in the traffic path. Examination of traffic is described in more detail below.

The blocking controller 130 may be configured to obtain monitoring and/or examination results from the monitor(s) 120 and/or the examiner(s) 125 and, based on these results, the degree of trust associated with the network element 145, and/or input received through the human expert interface 140, may send one or more blocking commands to the blocking filter(s) 135 to block a desired portion of the traffic associated with the network element 145. Blocking of traffic is described in more detail below.

The human expert interface 140 may be configured to provide monitoring and/or examination results to a user and to obtain input from a user that may be provided to the monitor(s) 120, examiner(s) 125, and/or the blocking controller 130.

Although FIG. 1 illustrates an exemplary communication network, it will be understood that the present invention is not limited to such configurations, but is intended to encompass any configuration capable of carrying out the operations described herein.

The verification system 110, monitoring/examination controller 115, monitor(s) 120, examiner(s) 125, blocking controller 130, blocking filter(s) 135, and/or human expert interface 140 may be embodied as one or more data processing systems that comprise, for example, input device(s), such as a keyboard or keypad, a display, and a memory that communicate with a processor. Such data processing system(s) may further include a storage system, a speaker, and an input/output (I/O) data port(s) that also communicate with the processor. The storage system may include removable and/or fixed media, such as floppy disks, ZIP drives, hard disks, or the like, as well as virtual storage, such as a RAMDISK. The I/O data port(s) may be used to transfer information between the data processing system(s) and another computer system or a network (e.g., the Internet). These components may be conventional components such as those used in many conventional computing devices, which may be configured to operate as described herein. Moreover, the functionality of the verification system 110, monitoring/examination controller 115, monitor(s) 120, examiner(s) 125, blocking controller 130, blocking filter(s) 135, and/or human expert interface 140 may be implemented as a single processor system, a multiprocessor system, or even a network of stand-alone computer systems, in accordance with various embodiments of the present invention. The monitor(s) 120, examiner(s) 125, and/or blocking filter(s) 135 may be embodied as network elements in the communication network 150 or may be embodied as software/firmware applications in one or data processing systems.

Computer program code for carrying out operations of the verification system 110, monitoring/examination controller 115, monitor(s) 120, examiner(s) 125, blocking controller 130, blocking filter(s) 135, and/or human expert interface 140 may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Exemplary operations for monitoring, examining, and/or blocking traffic associated with a network element based on whether the network element can be trusted, in accordance with some embodiments of the present invention, will now be described with reference to FIGS. 2 and 1. Operations begin at block 200 where the verification system 110 determines whether a network element 145 can be trusted and/or to what degree that network element can be trusted. As discussed above and in detail in the '249 application and the '169 application, the verification system 110 may determine a degree of trust for a network element 145 by comparing hash values generated for data associated with the network element 145. Advantageously, the verification system 110 may be configured to automatically evaluate the network element 145 to determine a degree of trust for the network element 145. For example, the verification system 110 may generate a hash value for data associated with the network element 145 every time a timer expires, a packet count is reached, a particular event occurs at the network element 145, such as, for example, the start of a session initiation protocol (SIP) or Voice over Internet Protocol (VoIP) session, and/or a direct command to perform a hash operation on the data associated with the network element 145. Referring to FIG. 3, the verification system 110 may, at block 300, generate a first hash value for data associated with the network element 145 where the first hash value is based on a configuration of the network element at a first time and may, at block 305, generate a second hash value for data associated with the network element where the second hash value is based on a configuration of the network element at a second time different than the first time.

At block 205, the traffic associated with the network element 145 is monitored based on whether the network element 145 can be trusted. As discussed above, the monitoring/examination controller 115 may select traffic associated with the network element 145 to be monitored based on rules stored in the monitoring/examination controller 115. These rules may be based on the degree of trust determined for the network element 145.

In some embodiments, the monitoring/examination controller 115 may specify to the monitor 120 the traffic to be monitored based on traffic classification, e.g., what traffic should be monitored/examined, a time duration, e.g., how long should monitoring take place, and/or a traffic amount, e.g., a maximum amount of traffic to be monitored.

The monitor 120 may use rules, pattern matching techniques, and/or deviation from expected values techniques to determine if the traffic contains unexpected information. The particular rules, pattern matching techniques and/or deviation from expected values techniques used may be based on the degree of trust for the network element. Moreover, the particular monitoring results provided to the human expert interface 140 may also be based on the degree of trust for the network element.

In some embodiments, input may be obtained via the human expert interface 140 and monitoring results may be revised with respect to whether the traffic contains unexpected information based on the obtained input.

At block 210, at least some of the monitored traffic is selected for examination by an examiner 125 based on the degree of trust for the network element 145. Examination of the traffic may be viewed, for example, as having two components: an examination type and a level or depth of examination. In some embodiments, an examiner 125 may examine at least some monitored traffic using such types of examination as rules, pattern matching techniques, and/or deviation from expected values techniques to determine if the traffic contains unexpected information. The particular type of examination used may be based on the degree of trust for the network element 145. Moreover, a level or depth of examination may be based on the degree of trust for the network element 145. For example, more time may be taken to run a more difficult, but potentially more effective examination algorithm. More examination stages may be applied, for example, to look successively into nested payloads. More associated connections or sessions may be examined where there is reason to believe that such connections/sessions may be related.

The particular examination results provided to the human expert interface 140 may be based on the degree of trust for the network element. In some embodiments, input may be obtained via the human expert interface 140 and examination results may be revised with respect to whether the traffic contains unexpected information based on the obtained input.

At block 215, at least some of the monitored and/or examined traffic may be selected by the blocking controller 130 to be blocked based on the degree of trust for the network element 145. Thus, the amount and/or particular traffic monitored, examined, and/or blocked may be selected in a proportionate manner to the degree of trust for the network element 145. The blocking controller 130 may, for example, command the blocking filter(s) 135 to block traffic associated with the network element 145 to use filtering based on source/destination address, port, protocol, and/or state of a connection/session. In some embodiments, input may be obtained via the human expert interface 140 and blocking of selected traffic may be made permanent, for example, where blocking of selected traffic may normally be a temporary event.

In accordance with some embodiments of the present invention, the monitoring, examining, and ultimately blocking of selected traffic associated with an untrusted network element 145 may be adapted based on feedback obtained from monitors 120 and/or examiners 125. For example, the monitors 120 and/or the examiners 125 may provide feedback to the blocking controller 130 on the efficacy of the monitoring and/or examination operations. Based on this feedback, the blocking controller 130 may modify rules, pattern matching techniques, and/or deviation from expected values techniques used in monitoring the traffic and/or examination of at least some of the monitored traffic to improve the results obtained from monitoring and/or examining traffic associated with the untrusted network element 145.

Figure 2:
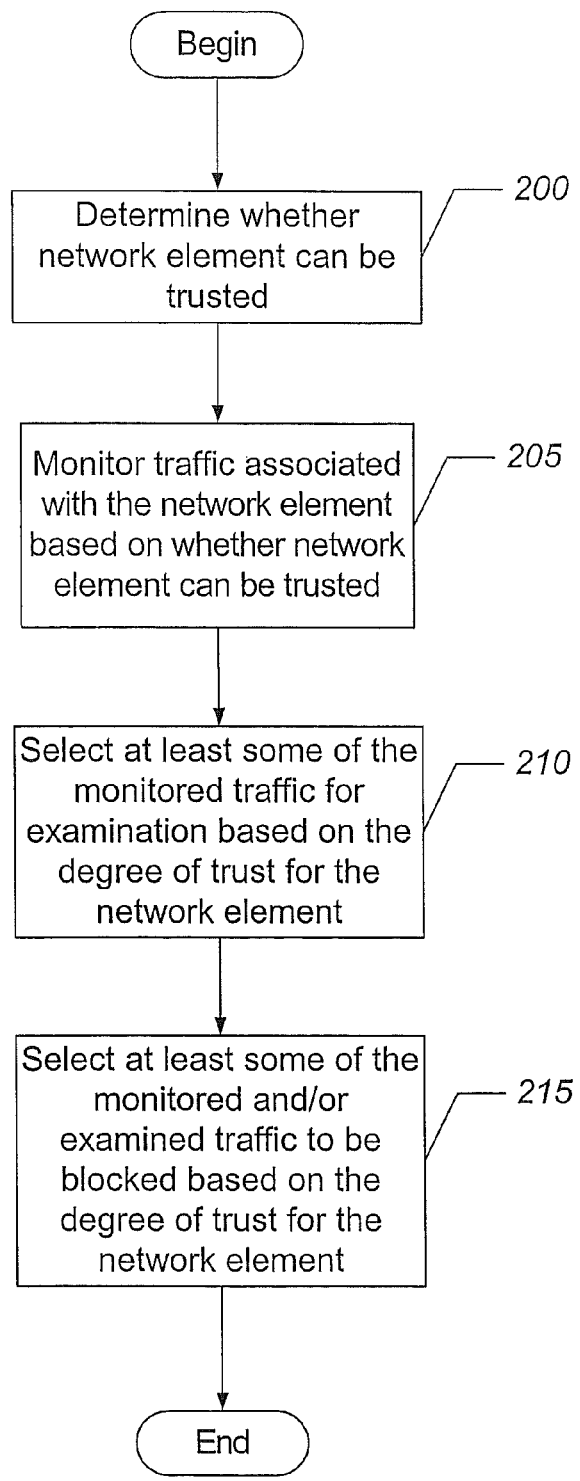
FIGS. 2 and 3 are flowcharts that illustrate operations of monitoring, examining, and/or blocking traffic associated with a network element based on whether the network element can be trusted in accordance with some embodiments of the present invention.
Figure 3:
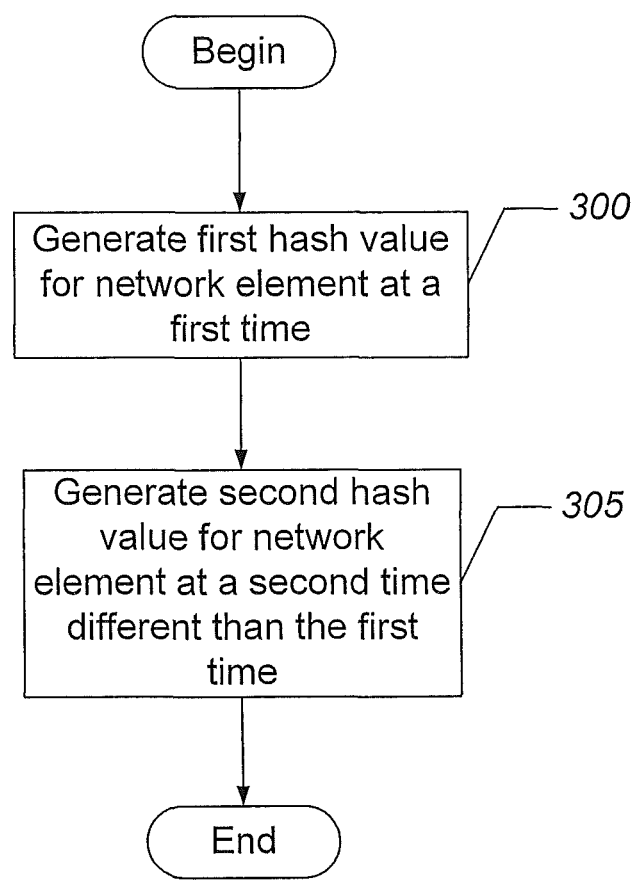

The flowchart of FIG. 2 illustrates the architecture, functionality, and operations of some embodiments of methods, systems, and computer program products for monitoring, examining, and/or blocking traffic associated with a network element based on whether the network element can be trusted. In this regard, each block represents a module, segment, or portion of code, which comprises one or more executable instructions for implementing the specified logical function(s). It should also be noted that in other implementations, the function(s) noted in the blocks may occur out of the order noted in FIG. 2. For example, two blocks shown in succession may, in fact, be executed substantially concurrently or the blocks may sometimes be executed in the reverse order, depending on the functionality involved.

Some embodiments of the present invention may be illustrated by way of example. Some time in the past, the verification system 110 checks the configuration of Mandy's modem such that an initial acceptable hash result is recorded. After expiration of a timer, the verification system 110 re-checks Mandy's modem to record recent hash results. Mandy then initiates a high-quality SIP videoconference. The verification system 110 either re-checks Mandy's modem to generate a new hash result or accesses the most recent hash result and performs a compare with the initial acceptable hash result. The verification system 110 determines that a change has occurred such that the level of trust for Mandy's modem has been compromised. In particular, the verification system 110 reports a degree of trust of 4 out of 10 to the monitoring/examination controller 115, which triggers a monitoring and examination event. Mandy's videoconference session, and possibly other traffic to and from Mandy, is monitored and examined. A human expert views the results of the monitoring and examination of Mandy's traffic and adjusts the level of examination via the human expert interface 140 to better discern what is going on. The monitored data is sent to a deep-examination examiner 125 that determines that a sophisticated attack is in progress, which was not apparent before the deep examination was undertaken. The examination results are provided to the human expert via the human expert interface who in response provides adaptation input to adjust monitoring parameters so that future attacks such as this one will automatically be blocked without requiring examination first. Mandy's videoconference ended before the examination results were available so her conference was not blocked; however, due to the adaptation, suspicious packets of the type observed during her just completed video conference will be blocked in the future.

Many variations and modifications can be made to the embodiments described herein without substantially departing from the principles of the present invention. All such variations and modifications are intended to be included herein within the scope of the present invention, as set forth in the following claims.

That which is claimed:

1. A method of operating a communication network, comprising:
    determining whether a network element can be trusted, wherein determining whether a network element can be trusted comprises:
    generating a first hash value based on data associated with the network element wherein the first hash value is based on a configuration of the network element at a first time and the first hash value is an acceptable result for the configuration of the network element;
    generating a second hash value based on the data associated with the network element wherein the second hash value is based on a configuration of the network element at a second time different than the first time;
    comparing the first hash value with the second hash value to determine whether the network element can be trusted based on whether a change has occurred in the configuration of the network between the first time and the second time;
    monitoring traffic associated with the network element based on whether the network element can be trusted; and
    selecting some of the traffic that was monitored to be blocked based on the degree of trust for the network element;
    wherein monitoring traffic comprises:
    monitoring the traffic using rules to determine if the traffic contains unexpected information based on the degree of trust for the network element;
    providing results with respect to whether the traffic contains unexpected information to a human expert interface based on the degree of trust for the network element;
    selecting traffic for monitoring using rules that are based on network element trust information; and
    selecting some of the traffic that was monitored for examination based on a degree of trust for the network element;
    wherein monitoring traffic further comprises:
    specifying the traffic to be monitored based on traffic classification;
    examining the traffic that was monitored and was selected using rules using a level of examination selected from a plurality of levels of examination to determine whether the traffic contains unexpected information based on the degree of trust for the network element; and
    providing results with respect to whether the traffic that was monitored and was selected using rules contains unexpected information to the human expert interface based on the degree of trust for the network element;
    wherein the level of examination of the traffic that was monitored and was selected using rules is based on the degree of trust for the network element.

2. The method of claim 1, wherein comparing the first hash value with the second hash value to determine whether the network element can be trusted comprises comparing the first hash value with the second hash value to determine a degree of trust for the network element.

3. The method of claim 1, wherein monitoring traffic further comprises:
    specifying the traffic to be monitored based on one of a time duration and a traffic amount.

4. The method of claim 1, wherein monitoring the traffic further comprises:
obtaining input via the human expert interface; and revising the results with respect to whether the traffic contains unexpected information based on the input.

5. The method of claim 1, further comprising:
examining the some of the traffic that was monitored using one of rules, pattern matching techniques, and deviation from expected values techniques to determine if the traffic contains unexpected information based on the degree of trust for the network element.

6. The method of claim 5, wherein examining the some of the traffic that was monitored comprises:
obtaining input via the human expert interface; and
revising the results with respect to whether the some of the traffic that was monitored contains unexpected information based on the input.

7. The method of claim 1, further comprising:
blocking the some of the traffic to be blocked using filtering based on one of source address, destination address, port, protocol, and state of a connection.

8. The method of claim 7, wherein blocking the some of the traffic to be blocked comprises:
obtaining input via the human expert interface; and
permanently blocking the some of the traffic to be blocked based on the input.

9. The method of claim 1, further comprising:
modifying rules, pattern matching techniques, and deviation from expected values techniques used in monitoring the traffic and examining the some of the traffic.

10. A method according to claim 1 wherein the network element is a communications device comprising one of a router, a gateway, a switching device, a cable modem, a digital subscriber line modem, a public switched telephone network modem, a wireless local area network modem, a wireless wide area network modem, a computer with a modem, a mobile terminal with a modem, a personal data assistant with a modem, and a cellular telephone with a modem.

11. A system, comprising:
a processor; and
a memory coupled to the processor and comprising computer readable program code embodied in the memory that when executed by the processor causes the processor to perform operations comprising:
generating a first hash value based on data associated with the network element wherein the first hash value is based on a configuration of the network element at a first time and the first hash value is an acceptable result for the configuration of the network element;
generating a second hash value based on the data associated with the network element wherein the second hash value is based on a configuration of the network element at a second time different than the first time;
comparing the first hash value with the second hash value to determine whether the network element can be trusted based on whether a change has occurred in the configuration of the network between the first time and the second time;
monitoring traffic associated with the network element based on whether the network element can be trusted; and
selecting some of the traffic that was monitored to be blocked based on the degree of trust for the network element;
wherein monitoring traffic comprises:
monitoring the traffic using rules to determine if the traffic contains unexpected information based on the degree of trust for the network element;
providing results with respect to whether the traffic contains unexpected information to a human expert interface based on the degree of trust for the network element;
selecting traffic for monitoring using rules that are based on network element trust information; and
selecting some of the traffic that was monitored for examination based on a degree of trust for the network element;
wherein monitoring traffic further comprises:
specifying the traffic to be monitored based on traffic classification;
examining the traffic that was monitored and was selected using rules using a level of examination selected from a plurality of levels of examination to determine whether the traffic contains unexpected information based on the degree of trust for the network element; and
providing results with respect to whether the traffic that was monitored and was selected using rules contains unexpected information to the human expert interface based on the degree of trust for the network element;
wherein the level of examination of the traffic that was monitored and was selected using rules is based on the degree of trust for the network element.

12. The system of claim 11, wherein comparing the first hash value with the second hash value to determine whether the network element can be trusted comprises comparing the first hash value with the second hash value to determine a degree of trust for the network element.

13. The system of claim 11, wherein monitoring traffic further comprises:
specifying the traffic to be monitored based on one of a time duration and a traffic amount.

14. The system of claim 11, wherein monitoring the traffic further comprises:
obtaining input via the human expert interface; and
revising the results with respect to whether the traffic contains unexpected information based on the input.

15. The system of claim 11, wherein the operations further comprise:
examining the some of the traffic that was monitored using one of rules, pattern matching techniques, and deviation from expected values techniques to determine if the traffic contains unexpected information based on the degree of trust for the network element.

* * * * *